US011356966B2

(12) United States Patent
Raza et al.

(10) Patent No.: US 11,356,966 B2
(45) Date of Patent: Jun. 7, 2022

(54) CARRIER FREQUENCY OFFSET ESTIMATION AND ELIMINATION

(71) Applicant: Kabushiki Kaisha Toshiba, Minato-ku (JP)

(72) Inventors: Usman Raza, Bristol (GB); Michael Baddeley, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 115 days.

(21) Appl. No.: 16/866,726

(22) Filed: May 5, 2020

(65) Prior Publication Data

US 2021/0352598 A1 Nov. 11, 2021

(51) Int. Cl.
*H04L 12/28* (2006.01)
*H04W 56/00* (2009.01)
*H04L 27/00* (2006.01)

(52) U.S. Cl.
CPC ... *H04W 56/001* (2013.01); *H04L 2027/0026* (2013.01)

(58) Field of Classification Search
CPC ..................................................... H04L 12/28
USPC ........................................................ 370/350
See application file for complete search history.

(56) References Cited

U.S. PATENT DOCUMENTS

2011/0077017 A1\* 3/2011 Yu ..................... H04W 28/0236
455/452.1

OTHER PUBLICATIONS

Hou, et al., "Physical Layer Authentication for Mobile Systems with Time-Varying Carrier Frequency Offsets", IEEE Transactions on Communications, vol. 62, No. 5, May 2014, 11 pages.

Hou, et al., "Physical Layer Authentication in OFDM Systems Based on Hypothesis Testing of CFO Estimates", IEEE International Conference on Communications (ICC), 2012, pp. 3559-3563.

Pospisil, et al., "Experimental Study of Wireless Transceiver Authentication Using Carrier Frequency Offset Monitoring" 25$^{th}$ International Conference Radioelektronika (RADIOELEKTRONIKA), 2015, 4 pages.

Brachmann, et al., "Keep the Beat: On-The-Fly Clock Offset Compensation for Synchronous Transmissions in Low-Power Networks", IEEE 42$^{nd}$ Conference on Local Computer Networks (LCN), 2017, 10 pages.

Baddeley, et al., "Competition: Adaptive Software Defined Scheduling of Low Power Wireless Networks", In International Conference on Embedded Wireless Systems and Networks (EWSN 2019), Feb. 2019, 3 pages.

\* cited by examiner

*Primary Examiner* — Dang T Ton

(74) *Attorney, Agent, or Firm* — Oblon, McClelland, Maier & Neustadt, L.L.P.

(57) ABSTRACT

Carrier frequency offset (CFO) estimation is effected by transmission of contemporaneous bit patterns, detectable by a receiver. By analysis of periodicity of bit error occurrences at the receiver, a beating period caused by interference between the two transmitters can be identified. From this beating period, a measure of CFO can be obtained.

19 Claims, 10 Drawing Sheets

CARRIER FREQUENCY OFFSET ESTIMATION AND ELIMINATION

FIELD

The present disclosure is concerned with approaches to carrier frequency offset estimation, and use cases related thereto.

DESCRIPTION OF EMBODIMENTS

Figure 1:
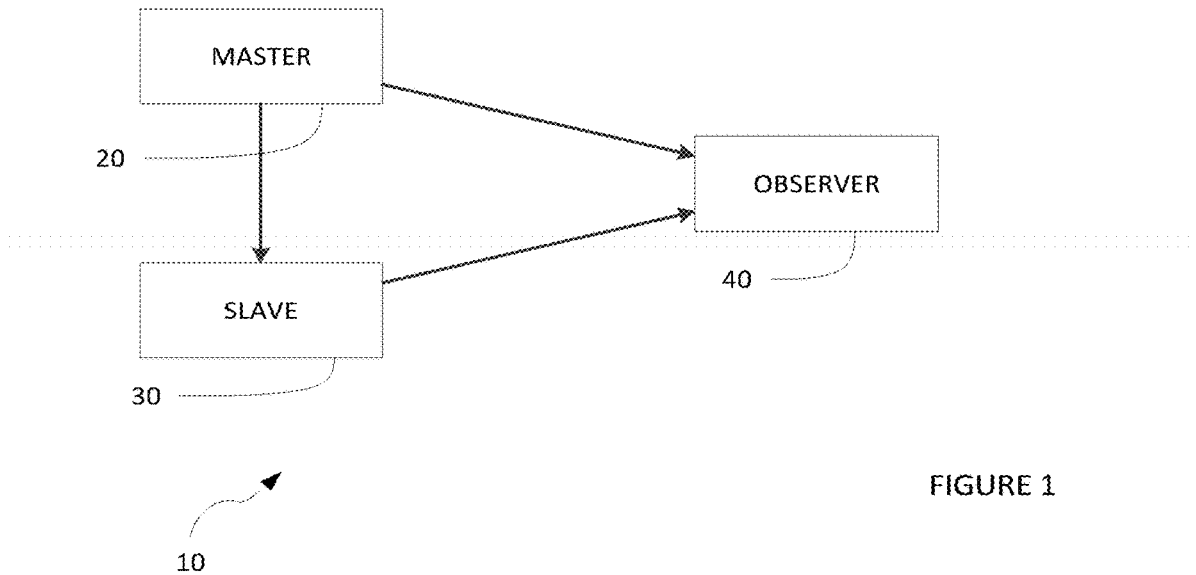
FIG. 1 is a schematic illustration of a network in accordance with an embodiment.

In general terms, embodiments disclosed herein harness a technique for estimating Carrier Frequency Offset (CFO). CFO can then be used as a radiometric signature for securing low power radios and for improving performance of communication and f systems.

An embodiment provides a method of estimating relative carrier frequency offset between two transmitters using an additional receiver that can detect signals from both transmitters. In certain embodiments, more than one additional receiver is provided, to detect signals from both transmitters. If more than one receiver is provided, each can determine an estimate of relative CFO, and the plurality of CFO estimates so obtained can be used to determine a more robust CFO estimate by, for example, averaging the plurality of CFO estimates.

The method may be arranged such that the two transmitters synchronously transmit packets, known in advance to the receiver, multiple times.

The receiver may detect the superimposed signals corresponding to the known transmitted packets and record a time-varying distribution of symbol/bit errors throughout the duration of the reception. The receiver, after recording symbol/bit errors over several receptions, may calculate the probability of a corrupted symbol/bit on each symbol/bit index for the length of the packet. The receiver may process the distribution of corruption over time (i.e., bit/symbol indices), for the purpose of finding the period between peaks of error probabilities that is then converted to a relative Carrier Frequency Offset (CFO).

One of the transmitters, which may be a slave of a master-slave pair, may synchronize its frequency to the other transmitter, which may be a master of a master-slave pair, by adjusting its frequency by the relative CFO. The slave may alternate transmissions over two frequencies calculated by adding and subtracting the estimated CFO respectively from an initial frequency used in the CFO estimation method. Aspects of the disclosure provide a method for elimination or reduction of relative CFO between transmitters.

The receiver may perform the detecting and recording, corruption probability calculating, and the probability distribution processing, separately for two frequencies, measure the periodicity, and choose the frequency with a greater period as the synchronized frequency for the slave.

The receiver may inform back to the slave to choose the frequency that increases the periodicity.

Low power radios for IoT applications are provided with crystal oscillators which are subject to inherent tolerances that result in inevitable Carrier Frequency Offsets (CFOs) from a desired central frequency. Popular standards such as IEEE 802.15.4 and Bluetooth Low Energy (BLE) limit the desirable inaccuracy to a few tens of parts per million (ppm). These values are approximately ±40 ppm and ±20 ppm respectively in each standard.

In real hardware, individual devices may have oscillators with varying inaccuracy with respect to the desired central frequency, from 0 ppm to the maximum allowed frequency drift by the standard. This inaccuracy may result from manufacturing tolerance, or operational/environmental factors.

An embodiment disclosed herein provides a mechanism to accurately estimate this oscillator drift by making distributed sets of nodes concurrently communicate with other receivers. As inaccuracy is specific to a given radio hardware, it can be used in several ways.

Examples of use cases include secure authentication of devices through physical layer fingerprinting, accurate localization, and reliable Synchronous Transmission(ST)-based communication in protocols (such as Glossy, FOCUS SoLiCiT and Atomic-SDN).

Since the inception of Glossy, one of the earliest ST-based reliable flooding protocols for low power networks, there has been an aim of achieving accurate (sub-symbol level) time synchronization between transmitters.

Embodiments described herein implement an arrangement wherein transmitters can be synchronized accurately in frequency. To do so, embodiments first estimate the relative CFO. CFO between transmitters can degrade the performance of ST-based protocols for large packet sizes and number of transmitters, thus limiting scalability of such protocols. Certain embodiments may aim to accurately time-synchronize the transmitters of a network, but also to frequency-synchronize these with carrier frequency offsets within a much narrower range than those permitted in the generally adopted technical standards (such as BLE and IEEE 802.15.4).

An embodiment of a wireless communications network 10 will now be described with reference to FIG. 1.

Figure 2:
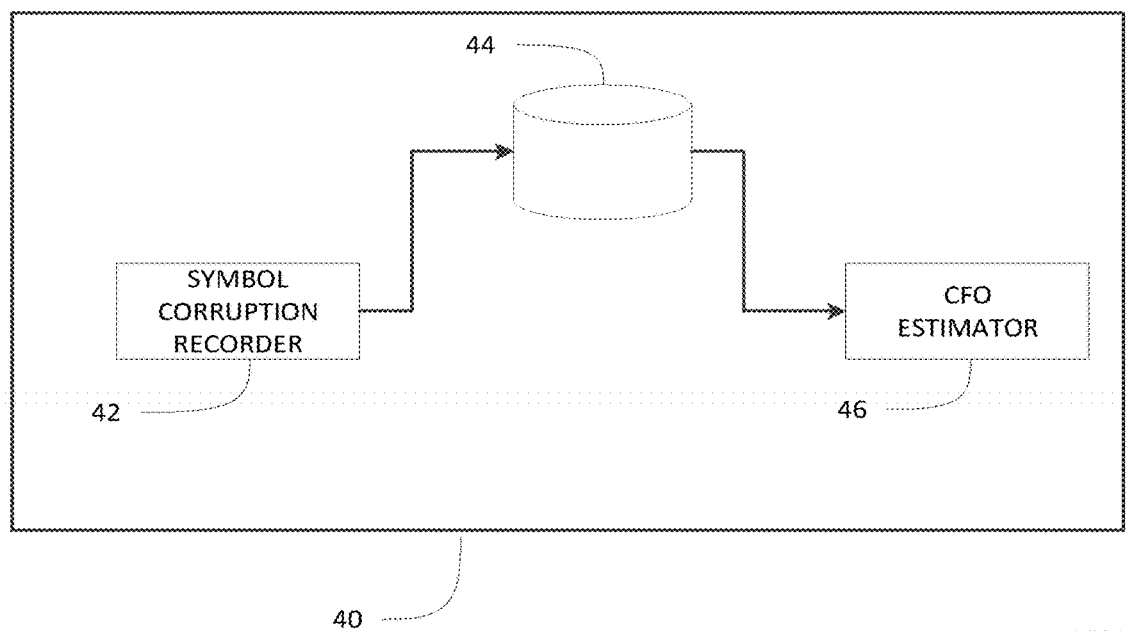
FIG. 2 is a schematic illustration of an observer of the network of FIG. 1.

The network comprises three radio devices consisting of a master 20, slave 30, and at least one observer/receiver 40. As shown in FIG. 2, the observer 40 comprises a symbol corruption recorder 42, and a data store 44 for storing information, recorded by the symbol corruption recorder 42, the information describing bit/symbol corruption detected over multiple repeated synchronous transmissions from master and slave. A CFO estimator 46 runs an algorithm to compute the periodicity of more frequent errors.

Figure 3:
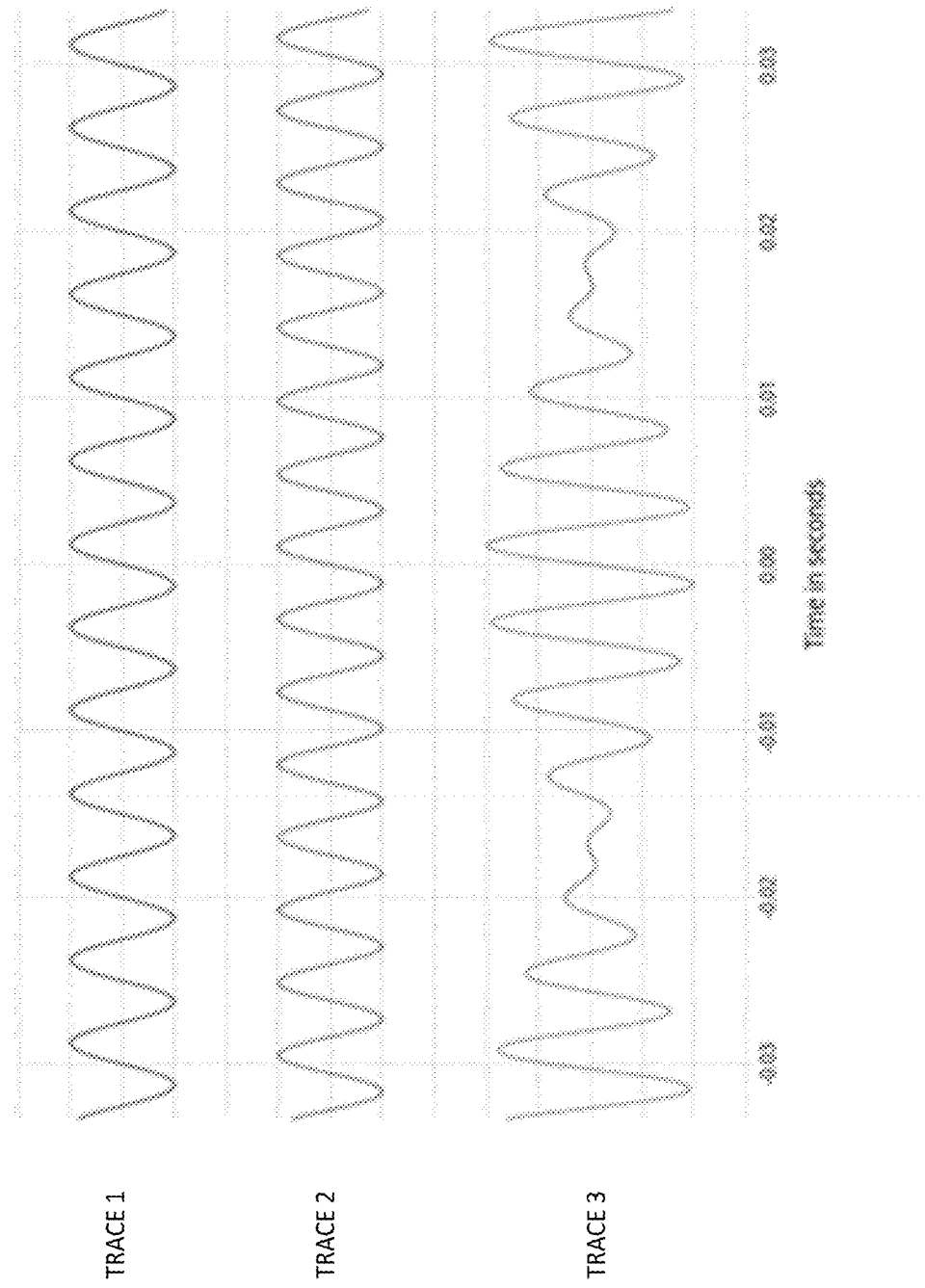
FIG. 3 is a diagram showing waveforms of signals used in a method of estimating carrier frequency offset in the network of FIG. 1.

FIG. 3 is illustrative of a general principle by which the observer/receiver 40 operates. FIG. 3 shows two sinusoidal waves (TRACE 1 and TRACE 2) transmitted by respective transmitters. The individual frequencies (200 Hz, 230 Hz) of the two waves are offset from each other by 30 Hz. These two sinusoidal waves, in this example, can be received at the observer/receiver 40. The two sinusoidal waves, when superimposed at the observer/receiver 40, result in formation of a waveform illustrated beneath (TRACE 3), comprising oscillations at a frequency which is a substantially the mean of the two transmitted frequencies, the amplitude of the oscillations varying by a sinusoidal function having a frequency also a function of the two transmitted frequencies. This is the so-called beating effect.

The beating effect can result in the signal energy periodically dropping below the sensitivity of the receiver. So, a packet transmission, if decoded on the receiver side, might see periodic bursts of bit errors in parts where waves are destructively interfering with each other.

It can be observed in FIG. 3 that the period of the beating effect is related to the difference between frequencies of the two carriers (i.e., 1/(30 Hz)=33.33 ms). So, by determining the period of the beating effect, and thus the frequency thereof, the CFO of one transmitter relative to the other can be determined.

In a specific case, one of the transmitters may be designated as being at the required central frequency, with the CFO of the or each other transmitter being determined relative to that designated one transmitter.

Embodiments described herein use this particular property to estimate the relative CFO between two time-synchronized transmitters using a receiver in proximity thereto. Embodiments may include providing more than one such receiver. Results from two or more receivers can be collated.

The above explanation assumes at least some time synchronization between the two transmitters. However, it should be noted that the beating effect, and the beating frequency in particular, is not dependent on time synchronization. The beating frequency would be same even when the two transmitters are slightly imperfectly synchronized.

Time synchronization is out of the scope of this disclosure as there are well-known techniques that can achieve sub-symbol level time synchronization.

In further detail, the master transmitter 20 is described with reference to FIG. 4.

Figure 4:
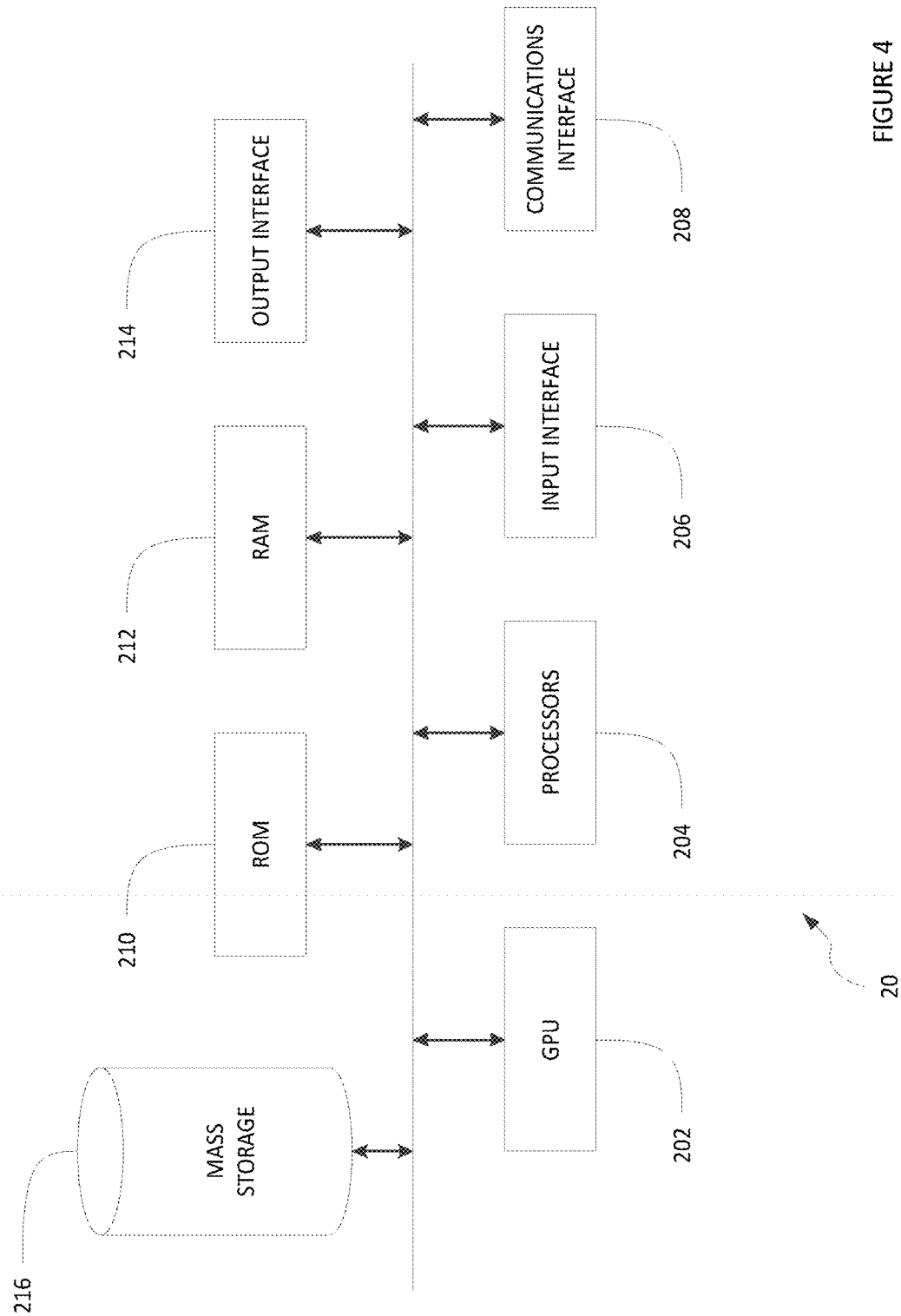
FIG. 4 is a diagram of the architecture of a master transmitter of the network of FIG. 1.

As shown in FIG. 4, the master transmitter 20 is a computer apparatus, in structure and function. It may share certain features with general purpose computer apparatus, but some features may be implementation specific, given the specialised function for which the master transmitter 20 is to be put. The reader will understand which features can be of general-purpose type, and which may be required to be configured specifically for use in a wireless communications transmitter.

The transmitter 20 thus comprises a parallel processor 202 configured for specific use in processing large data sets, suitable for use in digital communication. The transmitter 20 also comprises one or more other processors 204, either generally provisioned, or configured for other purposes such as mathematical operations, audio processing, managing a communications channel, and so on.

An input interface 206 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel, whether broadcast or end-to-end, with one or more recipients of signals. In the context of the present embodiment, the communications interface is configured to cause emission of a signal encoded by the transmitter 20.

The processors 204, and specifically for the benefit of the present disclosure, the parallel processor 202, are operable to execute computer programs, in operation of the transmitter 20. In doing this, recourse is made to data storage facilities provided by a mass storage device 208 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 210 is preconfigured with executable programs designed to provide the core of the functionality of the transmitter 20, and a Random Access Memory 212 is provided for rapid access and storage of data and program instructions in the pursuit of execution of a computer program. Each of these is configured to implement a communications protocol adopted by plural interoperable devices.

In further detail, the slave transmitter 30 is described with reference to FIG. 5.

Figure 5:
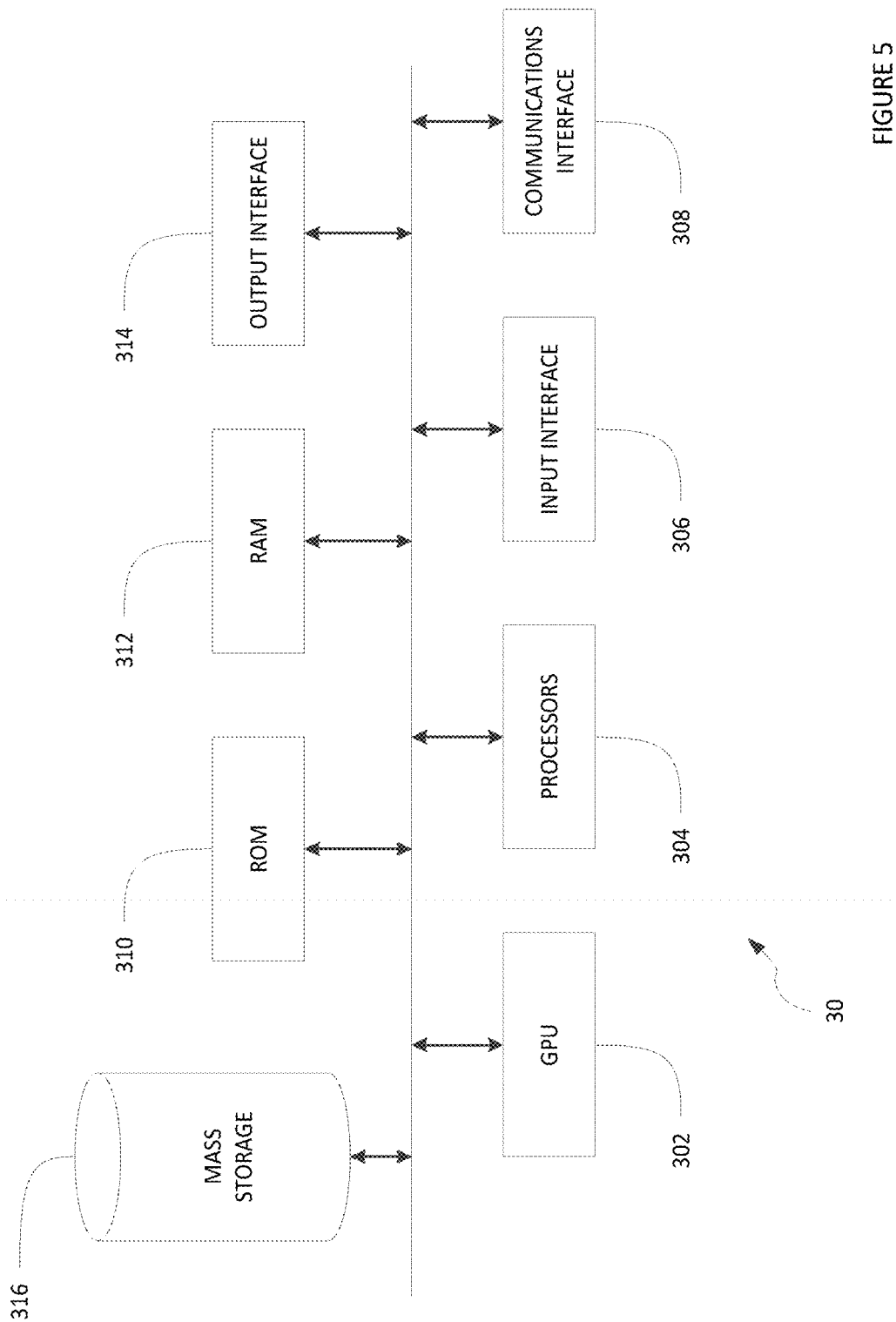
FIG. 5 is a diagram of the architecture of a slave transmitter of the network of FIG. 1.

As shown in FIG. 5, the slave transmitter 30 is a computer apparatus, in structure and function. It may share certain features with general purpose computer apparatus, but some features may be implementation specific, given the specialised function for which the slave transmitter 30 is to be put. The reader will understand which features can be of general purpose type, and which may be required to be configured specifically for use in a wireless communications transmitter.

The slave transmitter 30 thus comprises a parallel processor 302 configured for specific use in processing large data sets, suitable for use in digital communication. The slave transmitter 30 also comprises one or more other processors 304, either generally provisioned, or configured for other purposes such as mathematical operations, audio processing, managing a communications channel, and so on.

An input interface 306 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 314 is operable to provide a facility for output of signals to a user or another device. Such output could include a display signal for driving a local video display unit (VDU) or any other device.

A communications interface 308 implements a communications channel, whether broadcast or end-to-end, with one or more recipients of signals. In the context of the present embodiment, the communications interface is configured to cause emission of a signal encoded by the slave transmitter 30.

The processors 304, and specifically for the benefit of the present disclosure, the parallel processor 302, are operable to execute computer programs, in operation of the slave transmitter 30. In doing this, recourse is made to data storage facilities provided by a mass storage device 308 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 310 is preconfigured with executable programs designed to provide the core of the functionality of the transmitter 30, and a Random Access Memory 312 is provided for rapid access and storage of data and program instructions in the pursuit of execution of a computer program. The configuration applied by the ROM 310 and the RAM 312 enables the slave transmitter 30 to implement the same communications protocol as the master device 20.

In further detail, the observer 40 is described with reference to FIG. 6.

Figure 6:
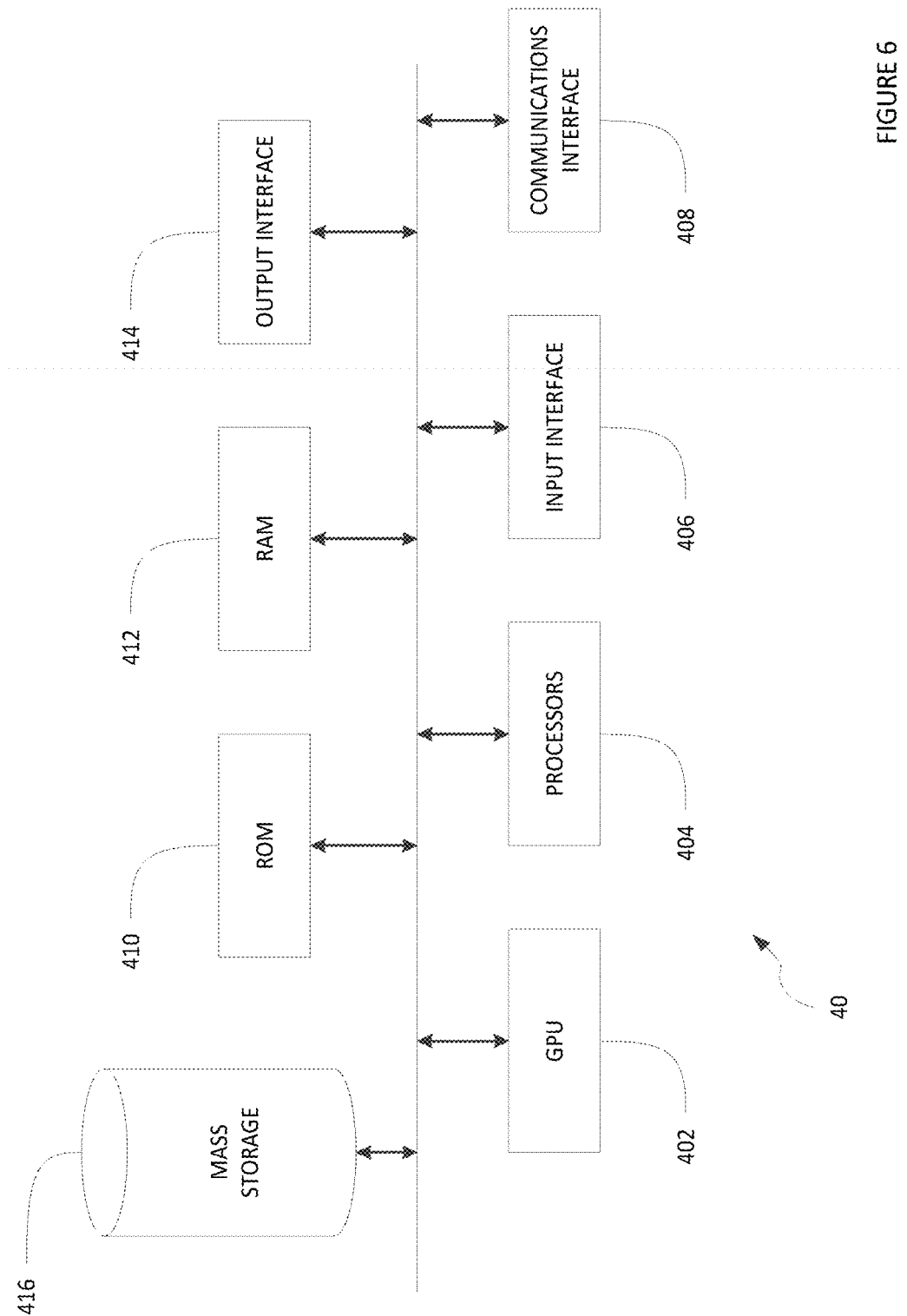
FIG. 6 is a diagram of the architecture of the observer of the network of FIG. 1.

As shown in FIG. 6, the observer 40 is a computer apparatus, in structure and function. It may share certain features with general purpose computer apparatus, but some features may be implementation specific, given the specialised function for which the observer 40 is to be put. The reader will understand which features can be of general purpose type, and which may be required to be configured specifically for use in a wireless communications device such as the observer 40.

The observer 40 thus comprises a parallel processor 402 configured for specific use in processing large data sets, suitable for use in digital signal processing and/or digital communication. The observer 40 also comprises one or more other processors 404, either generally provisioned, or configured for other purposes such as mathematical operations, audio processing, managing a communications channel, and so on.

An input interface 406 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 414 is operable to provide a facility for output of signals to a user or another device. Such output could include a display signal for driving a local video display unit (VDU) or any other device.

A communications interface 408 implements a communications channel, whether broadcast or end-to-end, with one or more recipients of signals. In the context of the present embodiment, the communications interface is configured to cause emission of a signal encoded by the observer 40.

The processors 404, and specifically for the benefit of the present disclosure, the parallel processor 402, are operable to execute computer programs, in operation of the observer 40. In doing this, recourse is made to data storage facilities provided by a mass storage device 408 which is implemented to provide large-scale data storage albeit on a relatively slow access basis, and will store, in practice, computer programs and, in the current context, signal processing data such as that implemented in the data store 44 of FIG. 2.

A Read Only Memory (ROM) 410 is preconfigured with executable programs designed to provide the core of the functionality of the observer 40, and a Random Access Memory 412 is provided for rapid access and storage of data and program instructions in the pursuit of execution of a computer program. Each of these is configured to implement a signal processing procedure as implemented at the observer 40 of the present embodiment.

Relative CFO Estimation

Figure 7:
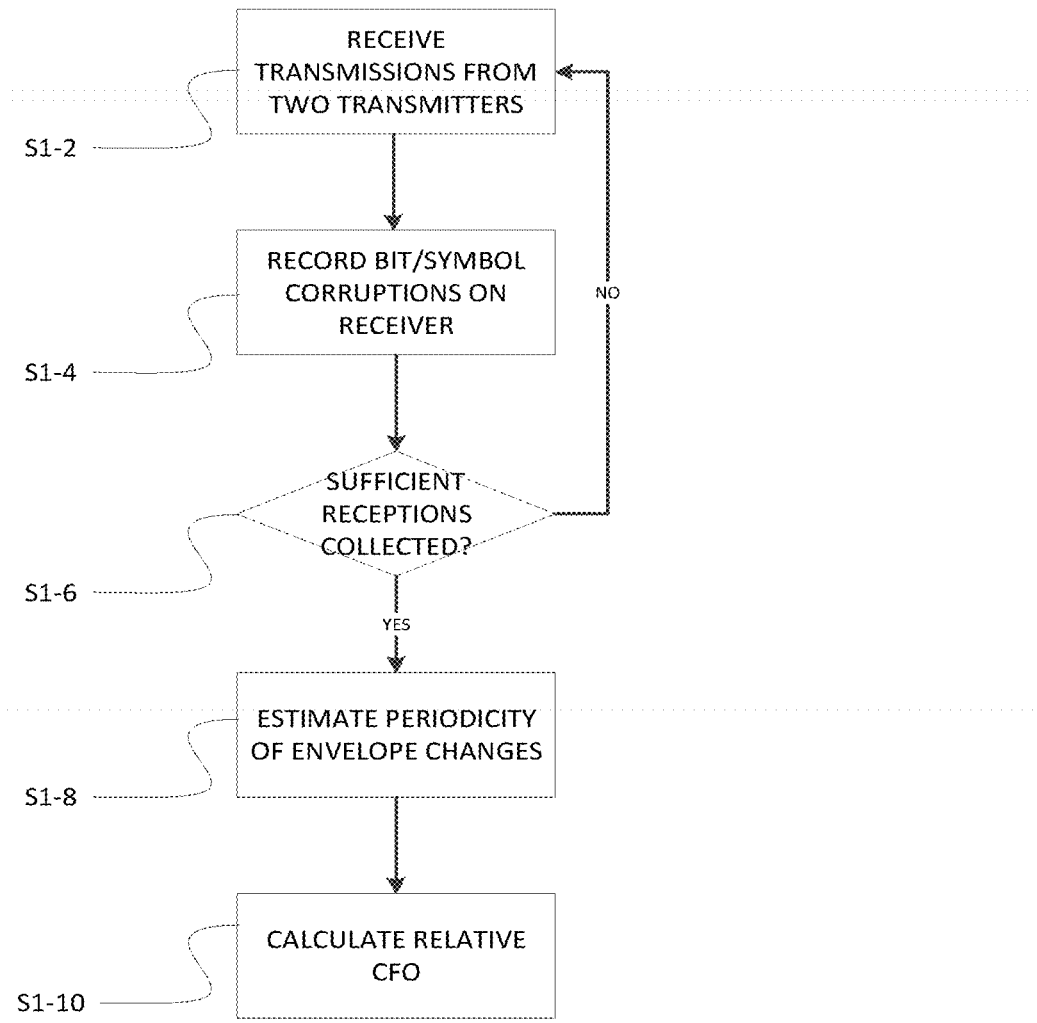
FIG. 7 illustrates a flow diagram of a method of estimating carrier frequency offset.

FIG. 7 illustrates an operational flow diagram for a method of estimating relative CFO using synchronous transmissions in the network illustrated in FIG. 1.

To estimate the relative CFO between the two devices 20, 30, the receiver/observer 40 is positioned to receive the baseband signal resulting from synchronous transmissions from these devices.

Firstly, in step S1-2, a sufficiently long packet is sent contemporaneously from the two synchronous transmitters 20, 30. The packet (and thus the resulting signal) must contain bits (symbols) that are known in advance at the observer 40; these bits are used in the CFO estimation. The packet transmissions are made (nominally) on the same carrier frequency. The actual carrier frequencies of the two contemporaneous transmissions, comprise the nominal frequency with the carrier frequency offset for the respective device.

What suffices as a sufficiently long transmission time will be implementation specific. Generally, it is desirable that the transmission time is longer than the beating period. The reader will appreciate that, before measurement commences, the duration of the beating period is not known. However, in context, there is likely to be a reasonable expectation as to how long the beating period can be.

As discussed above, in order for a device to remain compliant with a technical standard, it is commonplace to set a limit on CFO. For instance, BLE and IEEE 802.15.4 specify a maximum drift allowed by a crystal oscillator. For IEEE 802.15.4, this is ±40 ppm. This can at most cause a relative difference of 80 ppm between two transmitters compliant with the standard.

CFO can be mathematically converted to a beating period. The constraints on CFO, as set by standards, infer a corresponding range of the duration of a beating period. In the extreme case, in which the relative drift is at the maximum permitted by the relevant standard, the beating period is relatively small. This also means that the beating frequency is relatively high. Therefore, a relatively small transmission airtime will allow estimation of such a beating period.

Conversely, as the two transmitters approach zero relative drift, the beating period becomes longer. In the theoretical case, in the limit as the relative drift tends to zero, the beating period tends to infinity. In such a case, there reaches a point at which it is practically not possible to set a transmission airtime sufficiently long to enable measurement of such a small relative CFO.

However, a CFO compensation system can always strive to achieve a minimum target relative CFO. Thus, within a practical implementation, it is possible to provide CFO adjustment and compensation to within a tolerance. The concept of a "sufficiently long" packet airtime is set within this context. The purpose of implementations as disclosed is to provide a measure of CFO and any measure has a degree of accuracy attached to it. The reader will understand that the accuracy of this method depends on the length of airtime of the packet used to measure CFO. The transmissions are repeated, at agreed intervals, to provide the observer 40 with multiple receiving opportunities, to enable the gathering of sufficient data for decoding and signal analysis.

Then, the observer 40, on receiving the superimposed signal, attempts to decode the packet and in step S1-4 to record the bit inversions/corruptions on each bit index by matching it with the pre-known packet contents. This is information is collected over multiple receptions (step S1-6) so to compute a histogram of error probability over each bit index.

In several standards including IEEE 802.15.4 (which employs Offset Quadrature Phase Shift Keying+Direct Sequence Spread Spectrum) and Bluetooth coded physical layers, the actual symbol transmitted over the air does not have a one-to-one relationship with the bit index. For example, every 4 bits in the IEEE 802.15.4 standard maps to a pseudo-random noise sequence of 32 chips, each of which are transmitted over a duration of 0.5 us.

Figure 8:
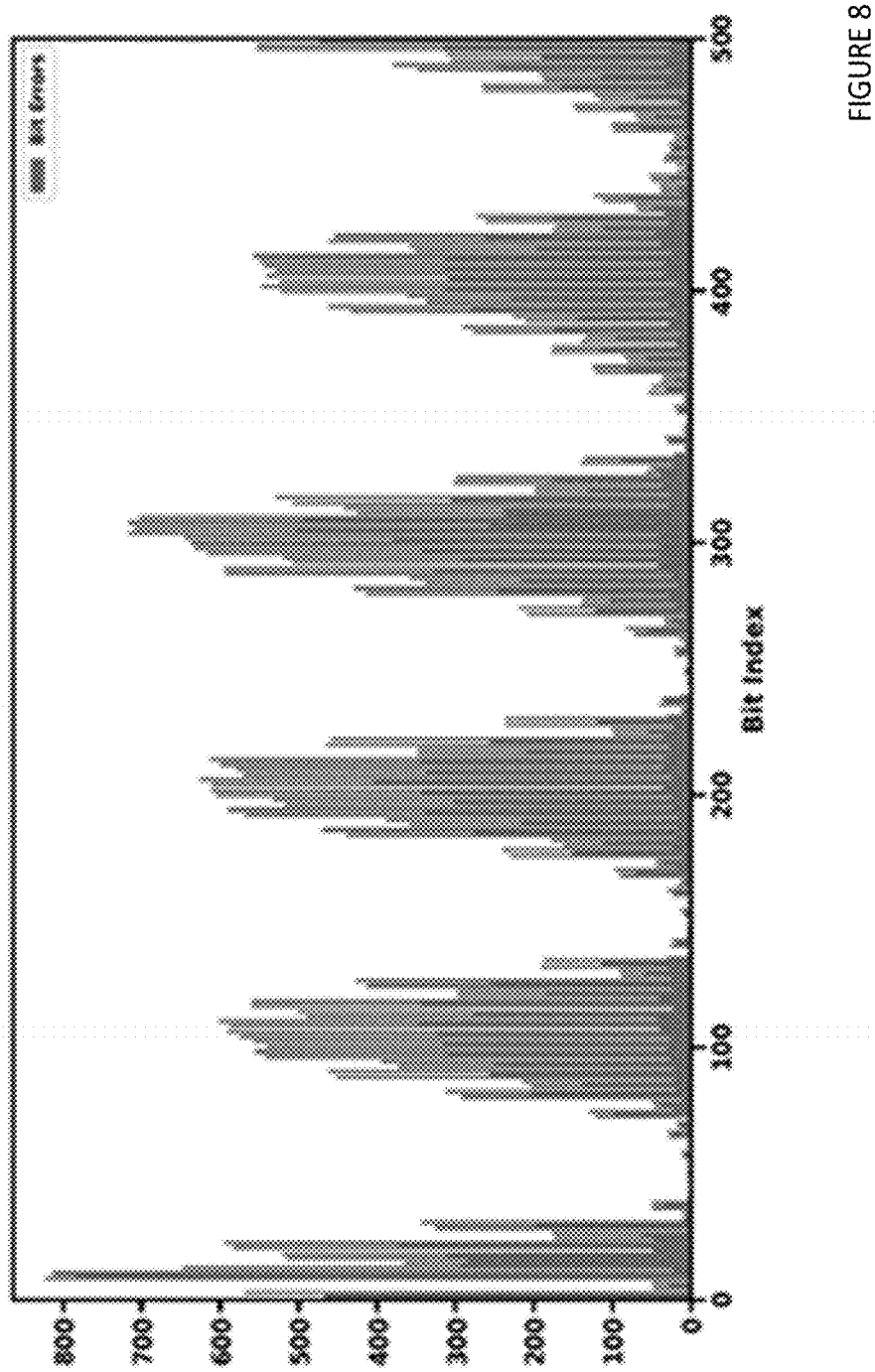
FIG. 8 illustrates a histogram of bit error distribution from which carrier frequency offset can be estimated in accordance with an embodiment.

In these cases, if access can be obtained to individual lower layer symbols (such as I/Q samples), the histogram can be computed on the individual chips rather than higher layer bits. This could provide more fine-grained visibility of error distribution and its periodicity than the coded error data (i.e., bits) shown in FIG. 8. However, it is to be noted that such visibility is not universally provided by third party radio frequency integrated circuits.

In the next stage of the process, in step S1-8, the period between peak error rates is estimated. The period is known in terms of number of bits/symbols. Then standard approaches such as auto-correlation and/or Fast Fourier Transform (FFT) can be used to measure the period duration. Finally, in step S1-10, the CFO is computed by the following equations at the receiver(s).

$$\text{Relative } CFO = \frac{PHY \text{ data rate}}{\text{bit period}} \text{ (Hz)}$$

Relative oscillator drift between the two transmitters can be computed using $$\text{Relative Oscillator Drift} = \frac{CFO \times 10^6}{\text{Carrier frequency}} \text{ (ppm).}$$

It should be noted that Relative Oscillator Drift can further be used to improve the synchronicity of transmitters, obviating the need for a Flock like mechanism.

In a particular embodiment, in which a network comprises a plurality of receivers, each capable of receiving the same set of transmissions, each receiver locally calculates on the basis of its received superimposed signal and then can send a report to a particular node at which the combination of all measurements can be computed to converge to a converged measure of the actual CFO or drift.

In a specific embodiment, two transmitters are set up to transmit signals at periodic time instances as governed by respective internal clocks. The two transmitters are time synchronised over the air by sending a synchronization beacon from one of the two transmitters, referred to as the master, to the other, referred to as the slave. Due to this synchronization, the master and slave can time their next transmission, at the next time instance. So, both the master and the slave simultaneously transmit in the next time instance (i.e. for the master this is the consecutive time instance after its initial transmission, and for the slave this is after its initial reception.

A third device, referred to as the observer, then receives and records all the bit/symbol errors (if any) over several repetitions. Based on the periodicity of recorded bit/symbol errors, the observer then computes the CFO.

It should be noted that, in certain embodiments, the initial synchronization beacon can be also sent by the observer in an alternative practical design.

Time synchronization between the two transmitters is necessary to enable the two transmitters to simultaneously transmit the signal. There are a number of different ways to achieve time synchronization. An example is shown In FIG. 1 where the master 20 sends the first beacon to the slave 30 so as to synchronize the slave 30 to the master 20. Then, the two nodes 20, 30 transmit the synchronized message to the observer 40.

In an alternative approach, the first step to achieve time synchronization can also be achieved by another network node sending the synchronization beacon to both the master 20 and the slave 30. Then, both the master 20 and the slave 30 are synchronised to that other network node. In an embodiment, that node is the observer node 40 of FIG. 1. In another embodiment, the other network node, sending the synchronization beacon is another node other than those illustrated in FIG. 1.

FIG. 4 shows bit errors arriving at the receiver in an example in which the two synchronous transmitters 20, 30 use IEEE 802.15.4 OQPSK+DSSS compliant radio to send data at a physical rate of 250 kbps (1 b every 4 microseconds). Periodicity of approximately 100 bits (i.e., 400 microseconds) can be observed; this relates to a relative CFO (a beating frequency) of 2.5 KHz (250 kbps/100 period), implying that the two transmitters are using frequencies of f and f−2.5 KHz or f and f+2.5 KHz. Here f refers to the actual frequency of the signal generated by the master node.

Another example can be made wherein the two transmitters 20, 30 and receiver 40 are implemented with Bluetooth Low Energy (BLE) compliant physical layers. In this example, a periodicity of 400 microseconds can be observed despite its different physical data rates (2 Mbps, 1 Mbps, 500 kbps, 125 kbps). This indicates that the beating frequency and relative CFO depends on the crystal oscillators and not the underlying physical data rate.

The estimated 2.5 KHz relative frequency offset is within the tolerance allowed for compliance with IEEE 802.15.4 standard operating at 2.4 GHz. However, in the present example, the RSSI observed at the receiver 40 drops below the receiver's sensitivity threshold 6 times over individual transmissions of the 64B packet at 250 kbps (2.048 ms) when the two transmitters 20, 30 are synchronously transmitting. This limits the reliability of ST based wireless systems that employ only a few transmitters (2 in this case) to achieve spatial diversity. The problem can be overcome by eliminating or reducing the CFO. Reduction in the CFO would result in a longer beating period; if the nodes are well synchronized in time then it may be possible to transmit a whole packet within a full beat period and thus avoid corruption.

For example, if the CFO is reduced from 2.5 KHz to 0.488 KHz or less, then the beating period would exceed the transmission time of a packet of 64B, resulting in more reliable receptions at the observer and unnoticeable beating periodicity at least over the length of the packet (i.e., period>packet transmission time). To achieve this effect, CFO reduction is performed.

As noted above, FIG. 8 is a histogram constructed to find the periodicity of the beating effect for the above example.

CFOs result in performance degradation in wireless communication systems because Inter-Carrier Interference (ICI) (resulting in non-orthogonality between different carriers as observed in OFDM systems) and inefficient spectrum utilization. Higher CFOs require that central frequencies of adjacent channels are sufficiently separated from each other. As a result, this limits the number of channels that can be packed in given spectrum bandwidth and thus the achievable capacity.

Furthermore, distributed diversity schemes, such as those employed by spatially separated synchronous transmitters, also suffer from a reduction in reliability when there is higher relative CFO; particularly for uncoded PHY layers for which there is no available fall-back option for recovery of errors (such as DSSS in IEEE 802.15.4).

Additionally, relative CFOs cause inaccuracy in positioning/localization systems. As part of knowing the location of the nodes, the distance and/or angle between two nodes (e.g., Angle of Arrival (AoA) and Angle of Departure (AoD)) is typically one of the first steps. Reducing CFO between the two devices also results in lower ranging and AoA/AoD.

Figure 10:
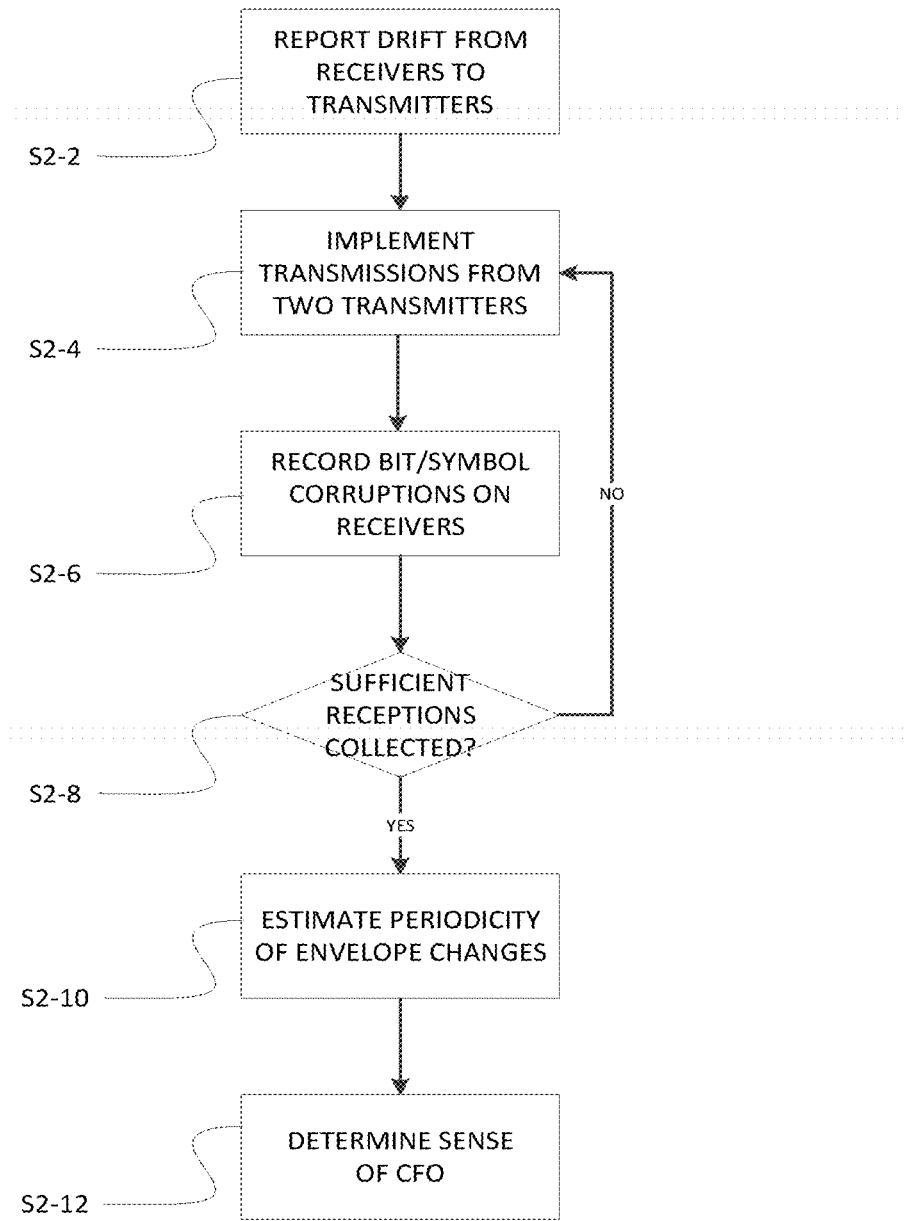
FIG. 10 illustrates a flow diagram of a method of estimating carrier frequency offset in the network of FIG. 9.

For optimization of both ST-based protocols and localization/ranging system elimination or reduction of CFO. FIG. 10 thus illustrates operational flow of a method for elimination or reduction of relative CFOs. The method is performed after estimating the CFO using the approach illustrated in FIG. 7.

Figure 9:
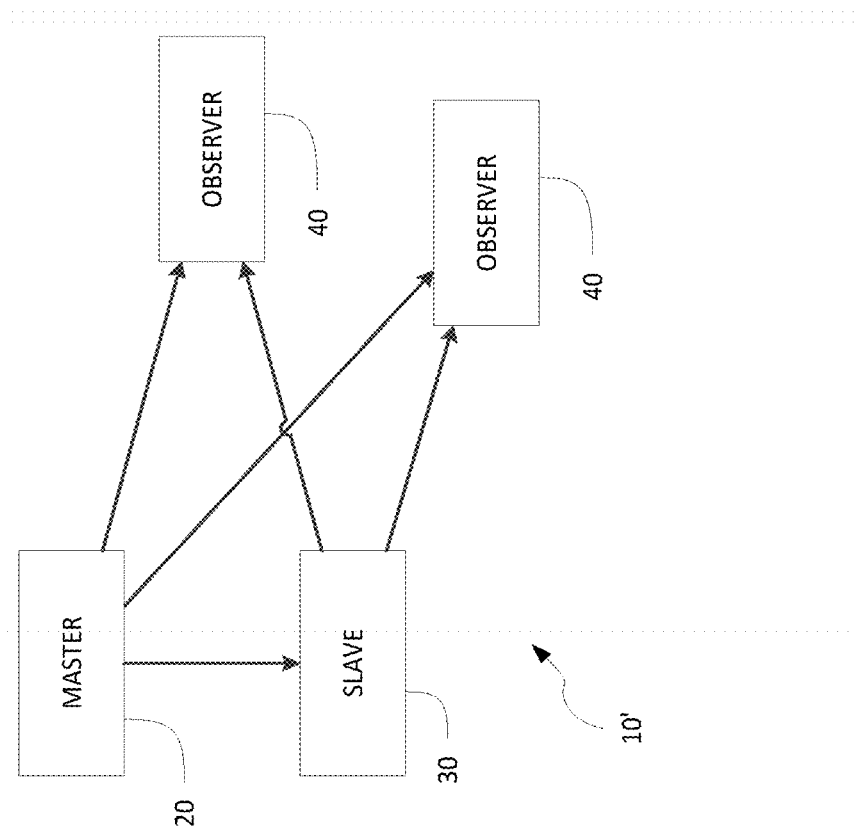
FIG. 9 is a schematic illustration of a network in accordance with a further embodiment.

The method is described in the context of a multi-receiver/observer network 10' as illustrated in FIG. 9. Use of such a network may enable gathering of more diverse information.

In a first step, S2-2, once each observer device 40 has estimated the CFO, it sends back this drift information to the two synchronous transmitters, the master 20 and the slave 30.

The CFO estimate in each case is relative, and the direction of drift between the master 20 and the slave 30 is not yet discernible. That is, it is not yet possible at this stage to determine which of the master 20 and the slave 30 has an oscillator (clock) that is running faster than the other. To determine this, in step S2-4, the master 20 maintains transmission at its central frequency f, while the slave 30 issues repeated multiple synchronous trial transmissions at two different frequencies (f+CFO and f-CFO) alternately, while the observer 40 switches to its receiving mode.

The observer node 40 then once again collects, step S2-6, statistics on bit/symbol errors in multiple packet receptions, with respect to the master 20 continuing to make transmissions at its central frequency f and the slave 30 making trial transmissions alternately at f'+CFO and f'-CFO. f' is the transmission frequency of the slave 30 when tuned to transmit to the same frequency f as the master. The observer node gathers separate sets of statistics in respect of the two combinations (f, f+CFO) and (f, f'-CFO). This continues until it is determined, step S2-8, that sufficient data has been collected.

Then, in step S2-10, the observer 40 estimates the period of error peaks separately for each of the two combinations. The combination that results in the period becoming longer (or becoming undiscernible over the length of packet) is considered, in step S2-12, to reduce the relative CFO between master and the slave. This also indicates the direction of drift between the two devices, i.e. which device has an oscillator running faster than the other. If running the slave 30 at f'+CFO gives rise to a longer or undiscernible beat period, then this establishes that the slave was running at lower frequency than the master (i.e. wherein f'=f-CFO), while if it is determine that running the slave 30 at f'-CFO leads to a longer or undiscernible beat period, then the slave was running slower than the master (i.e. wherein f'=f+CFO). This information can be further used to reduce drift accumulated over several synchronous transmissions.

Once the drift direction is known, i.e. once it is known whether the oscillator of the slave 30 is running faster or slower than that of the master 20, the observer device 40 can inform both master 20 and slave 30 devices as to the direction of drift and the actual CFO so that they can perform future transmission after frequency correction.

Multiple receivers can be used as observers. Estimates from all of these can be averaged to get more accurate estimates. This is possible in ST-based protocols such as Toshiba's FOCUS SoLiCiT and Atomic-SDN.

After obtaining CFO estimates, they can be put to further use, other than simply compensation or adjustment.

For instance, CFO estimates can be used to securely authenticate wireless devices. CFO can be used as a radiometric signature of a device. Once an attacker impersonates the device, but its CFO does not match the signature recorded against a genuine/authenticated device, it can be blocked by the network. Such mechanism can be applied to complement to other security mechanisms.

Figure 11:
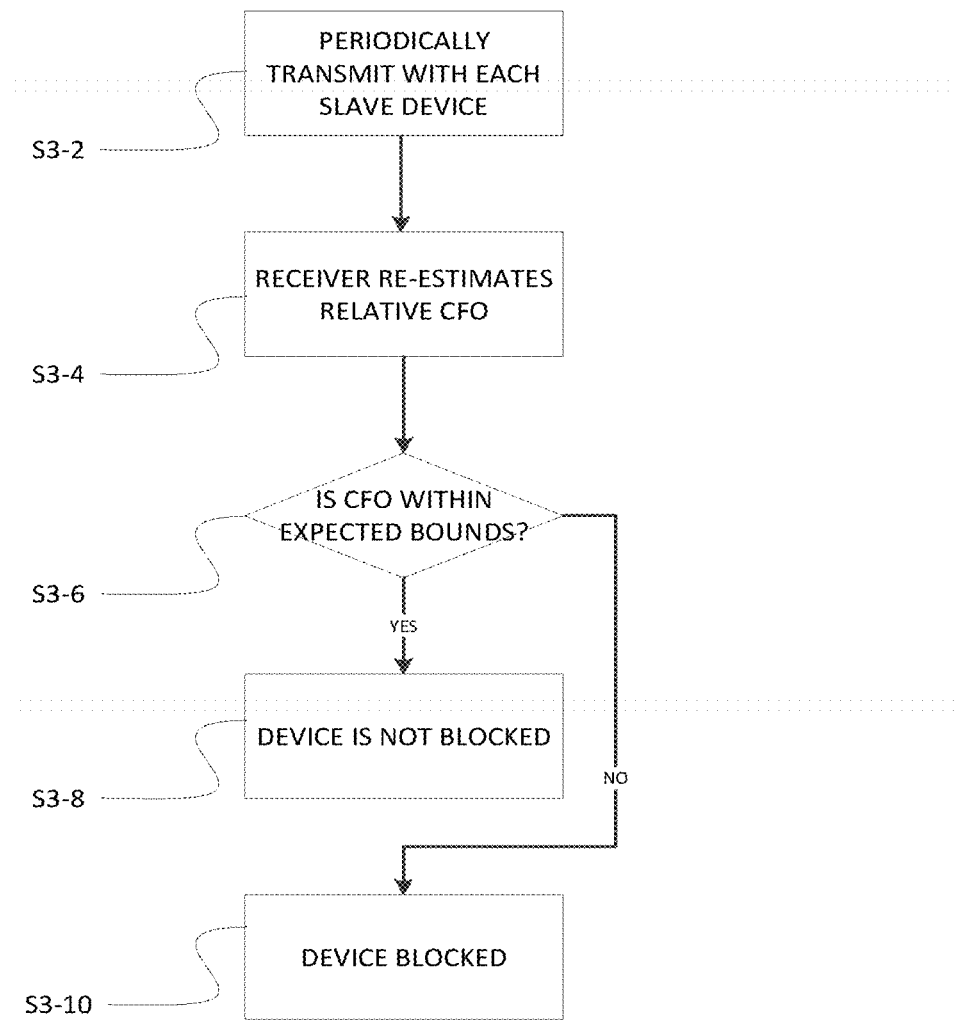
FIG. 11 illustrates a flow diagram for a method of managing authentication of transmitters in a network in accordance with an embodiment.

So, in an example as illustrated in FIG. 11, the example assumes that the master 20 and the receiver(s) 40 are trusted devices in the network, when other devices try to transmit to the network in a secure manner. So, any attacker device must not be able to impersonate a device that has previously securely joined the network. Thus, a recurring process checks whether communicating devices are still genuine devices. This can be detected by re-estimating relative CFO and checking it against the previous estimates performed during the secure joining process.

As shown, in step S3-2, the master device 20 periodically transmits alongside each previously authenticated slave device 30 according to a pre-agreed policy. The process shown in FIG. 6 is used at a receiving observer 40 to re-calculate, in step S3-4, the relative CFO between the master 20 and that particular slave device 30 in reference to the master 20. If, in step S3-6, the new estimate matches with the previously calculated CFO of that device within bounded limits (to account for external influences such as temperature and age of device), then in step S3-8, the slave device in question is not blocked. Otherwise, in step S3-10 the device is blocked as inauthentic.

It will be recognised by the reader that environmental factors, such as temperature, can affect an electronic device, and so can lead to CFO. Other conditions such as age can lead to long-term drift of a device, which can lead to a more long-term CFO. Both short and long term factors can affect the length of time for which a CFO estimate can be considered valid. The present disclosure proposes periodic re-estimation of CFO, to maintain performance.

Another approach would be to include, in a transmitting device, one or more sensors to measure environmental factors such as temperature. Manufacturers may provide a data sheet, which may be provided as a look up table, to enable temperature based compensation of an internal oscillator of a device. Equally, for authentication of a device, it may be sufficient for a device to report its temperature to a master, from which authentication of the temperature variant CFO of the device can be achieved.

Certain embodiments of the aspects disclosed herein may exhibit one or more advantages from the estimation (and, in some use cases, compensation of CFO).

For instance, as explained with reference to the use case disclosed above, it may be possible to use CFO, either alone or in combination with other device artefacts, as a manner of authenticating a device, so as to impart a degree of security on a network. By using CFO estimation as a radiometric signature associated with a genuine device, a device, or a network of devices, can be configured to detect if another device is authentic. If a device is determined to be inauthentic, in that it is attempting to impersonate an authenticated device, it can be blocked from access.

CFO compensation can, in certain embodiments, be used to accurate frequency synchronize transmitters so that reliability of reception, in the presence of a large number of transmitters and longer packets, can be improved.

CFO compensation can, in certain embodiments, be used to reduce errors in angles (of arrival and departure) of signal transmissions, as well as errors associated with transmission range, that can be caused by high CFO.

By applying CFO compensation, it may be possible, in certain embodiments, to manage channel spacing more effectively. That is, if CFO can be limited, the requirement for spacing between channels may be diminished.

By applying CFO compensation, accuracy of localization systems can be improved in certain embodiments, because many approaches to localization rely on accurate time of arrival measurements, which would be affected by CFO drift.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method comprising:
receiving, at a receiving device, a signal consequent of contemporaneous transmissions from first and second transmitters, the contemporaneous transmissions both being digital transmissions of a predetermined sequence of bits;
detecting in the signal a plurality of bit error occurrences on the received signal with respect to the predetermined sequence;
determining a periodicity of the bit error occurrences; and
determining from the periodicity a carrier frequency offset measure between the first and second transmitters.

2. The method in accordance with claim 1, wherein the contemporaneous transmissions by the first and second transmitters are on a same nominal carrier frequency.

3. The method in accordance with claim 1, further comprising receiving, at the second transmitter, a time synchronization beacon for synchronization of the contemporaneous transmissions from the first and second transmitters.

4. The method in accordance with claim 3, wherein the time synchronization beacon is emitted by the first transmitter.

5. The method in accordance with claim 3, wherein the time synchronization beacon is emitted by the receiving device.

6. The method in accordance with claim 1, wherein each transmission of the contemporaneous transmission includes a packet of duration commensurate with a minimum expected carrier frequency offset to be measured.

7. The method in accordance with claim 1, and further comprising;
emitting, from one of the first and second transmitters, a further transmission contemporaneous with a further transmission of the other of the first and second transmitters, one of the further transmissions being on a carrier frequency offset by an amount corresponding to the determined carrier frequency offset measure, the other of the further transmissions being on the nominal carrier frequency of the original transmissions, to determine a sense of the carrier frequency offset.

8. The method in accordance with claim 1, and further comprising adjusting the carrier frequency of one or both of the transmitters in response to the determined carrier frequency offset measure.

9. The method in accordance with claim 1, and further comprising;
maintaining a record of a carrier frequency offset measure of a transmitter relative to another transmitter, and
authenticating a transmitter by comparing a determined carrier frequency offset measure against the record for that transmitter.

10. The method in accordance with claim 1, and further comprising:
receiving, at a further receiving device, a signal consequent of contemporaneous transmissions from the first and second transmitters, the contemporaneous transmissions both being digital transmissions of a predetermined sequence of bits;
detecting in the signal a plurality of bit error occurrences on the received signal with respect to the predetermined sequence;
determining a periodicity of the bit error occurrences; and
determining from the periodicity a further carrier frequency offset measure between the first and second transmitters;
wherein the method further comprises collating the carrier frequency offset measure and the further carrier frequency offset measure to obtain a combined carrier frequency offset measure.

11. The method in accordance with claim 10, wherein the collating includes averaging the carrier frequency offset measure and the further carrier frequency offset measure and wherein the combined carrier frequency offset measure is an average carrier frequency offset measure.

12. A carrier frequency offset detector comprising:
a receiver to receive a signal consequent of contemporaneous transmissions from first and second transmitters, the contemporaneous transmissions both being digital transmissions of a predetermined sequence of bits;
a bit error detector to detect, with reference to the predetermined sequence, bit error occurrences on the received signal;
a bit error periodicity analyser to determine a periodicity of the bit error occurrences; and a carrier frequency offset measure generator to determine a carrier frequency offset measure between the first and second transmitters on the basis of the periodicity of the bit error occurrences.

13. The carrier frequency offset detector in accordance with claim 12, operable to emit a time synchronization beacon for synchronization of the contemporaneous transmissions from the first and second transmitters.

14. The carrier frequency offset detector in accordance with claim 12, wherein each transmission of the contemporaneous transmission includes a packet of duration commensurate with a minimum expected carrier frequency offset to be measured.

15. The carrier frequency offset detector in accordance with claim 12, wherein the receiver is operable further to receive a signal resultant from emission, from one of the first and second transmitters, a further transmission, contemporaneous with a further transmission of the other of the first and second transmitters, the further transmission on the one of the transmitters being on a carrier frequency offset by an amount corresponding to the determined carrier frequency offset measure, whereas the further transmission on the other of the first and second transmitters is at the original frequency, the detector thus being operable to determine a sense of the carrier frequency offset.

16. The carrier frequency offset detector in accordance with claim 12, operable to maintain a record of a carrier frequency offset measure of a transmitter relative to another transmitter, and to authenticate a transmitter by comparing a determined carrier frequency offset measure against the record for that transmitter.

17. A system comprising the carrier frequency offset detector in accordance with claim 12, and first and second transmitters.

18. The system in accordance with claim 17, and further comprising a further carrier frequency offset detector, wherein at least one of the detectors or transmitters includes a collator operable to collate the carrier frequency offset measures generated by the detectors to obtain an aggregated carrier frequency offset measure.

19. A non-transitory computer readable medium comprising computer executable instructions which, when implemented on a computing device, cause the computing device to perform operations of:
receiving a signal consequent of contemporaneous transmissions from first and second transmitters, the contemporaneous transmissions both being digital transmissions of a predetermined sequence of bits;
detecting in the signal a plurality of bit error occurrences on the received signal with respect to the predetermined sequence;
determining a periodicity of the bit error occurrences; and
determining from the periodicity a carrier frequency offset measure between the first and second transmitters.

* * * * *